United States Patent
Scherle et al.

(10) Patent No.: US 11,403,077 B2
(45) Date of Patent: Aug. 2, 2022

(54) METHOD AND SYSTEM FOR PREPARING BLOCK DIAGRAMS FOR CODE GENERATION

(71) Applicant: dSPACE digital signal processing and control engineering GmbH, Paderborn (DE)

(72) Inventors: Johannes Scherle, Calw (DE); Anders Johansson, Stuttgart (DE); Olaf Grajetzky, Paderborn (DE)

(73) Assignee: dSPACE GmbH, Paderborn (DE)

( * ) Notice: Subject to any disclaimer, the term of this patent is extended or adjusted under 35 U.S.C. 154(b) by 0 days.

(21) Appl. No.: 16/983,462

(22) Filed: Aug. 3, 2020

(65) Prior Publication Data
US 2021/0034337 A1  Feb. 4, 2021

(30) Foreign Application Priority Data
Aug. 1, 2019 (DE) ...................... 10 2019 120 829.7

(51) Int. Cl.
*G06N 20/00* (2019.01)
*G06F 8/35* (2018.01)
*G06F 8/36* (2018.01)
*G06F 8/34* (2018.01)

(52) U.S. Cl.
CPC .................. *G06F 8/35* (2013.01); *G06F 8/34* (2013.01); *G06F 8/36* (2013.01)

(58) Field of Classification Search
CPC ..... G06F 8/35; G06F 8/34; G06F 8/36; G06F 8/38; G06N 20/00
See application file for complete search history.

(56) References Cited

U.S. PATENT DOCUMENTS

| 8,495,114 | B1 | 7/2013 | Bryan et al. |
| 8,554,530 | B1 * | 10/2013 | O'Riordan ............. G06F 30/33 |
| | | | 716/106 |
| 8,805,651 | B1 | 8/2014 | Bartlett et al. |

(Continued)

OTHER PUBLICATIONS

Targetlink, Feb. 2018 (Year: 2018).*

(Continued)

*Primary Examiner* — Chat C Do
*Assistant Examiner* — Noor Alkhateeb
(74) *Attorney, Agent, or Firm* — Muncy, Geissler, Olds & Lowe, P.C.

(57) ABSTRACT

A method for preparing block diagrams having one or more blocks for code generation in a computing environment comprising a model editor, a data definition tool and a code generator. The block diagram is opened in the model editor, wherein a first block is a hierarchical block comprising a plurality of subordinate blocks, at least one input port and at least one output port connected by signals. Minimum values and maximum values are received for the input and output ports, determining scaling parameters for the input and output ports based on the received minimum and maximum values. Scaling parameters are determined for each subordinate block in the first block, wherein the scaling parameters of at least one subordinate block are determined based on the scaling parameters of at least one output port. Also, a method for generating program code, a non-transitory computer readable medium and a computer system are provided.

12 Claims, 4 Drawing Sheets

(56) References Cited

U.S. PATENT DOCUMENTS

| | | | | |
|---|---|---|---|---|
| 2008/0183524 | A1* | 7/2008 | Suresh | G06Q 10/0639 |
| | | | | 705/7.38 |
| 2009/0007064 | A1* | 1/2009 | Yang | G06F 8/34 |
| | | | | 717/106 |
| 2017/0102946 | A1* | 4/2017 | Truta | H04L 9/0643 |
| 2020/0284883 | A1* | 9/2020 | Ferreira | G01S 7/4817 |
| 2020/0371805 | A1* | 11/2020 | Lutz | G06F 9/30036 |

OTHER PUBLICATIONS

Evaluation of Automatic Code Generation Tools, Nora Ajwad, Apr. 2007 (Year: 2007).*
BTC Embedded Systems, Brockmeyer, Dec. 2018 (Year: 2018).*
Hanselmann et al., "Production Quality Code Generation from Simulink Block Diagrams," Proc. of IEEE Syposium on Computer Aided Control System Design, pp. 213-218 (Aug. 1999).

* cited by examiner

METHOD AND SYSTEM FOR PREPARING BLOCK DIAGRAMS FOR CODE GENERATION

This nonprovisional application claims priority under 35 U.S.C. § 119(a) to German Patent Application No. 10 2019 120 829.7, which was filed in Germany on Aug. 1, 2019, and which is herein incorporated by reference.

BACKGROUND OF THE INVENTION

Field of the Invention

The present invention relates to generating code from block diagrams and to preparing block diagrams for code generation.

Description of the Background Art

Electronic control units (ECUs) are ubiquitous especially in automotive applications; generally, they may contain a processor, such as a microcontroller, one or more sensor interfaces and one or more circuits to control an actuator. Current parameters of a physical process are preferably determined using the signals of the one or more sensors connected to the sensor interfaces. Based on a predefined control strategy, the processor may control the one or more circuits to apply the actuators for influencing the physical process. For example, an ECU may be used to perform anti-lock braking, with a sensor measuring the wheel velocity and a magnetic valve reducing the pressure in the corresponding wheel brakes.

In order to speed up the development process for ECUs, control strategies are preferably developed using block diagrams in a technical computing environment (TCE), such as MATLAB/Simulink of The MathWorks, which allows for tracing the temporal behavior of a physical system described by one or more blocks in the block diagram. The document "Production Quality Code Generation from Simulink Block Diagrams", Proceedings of the 1999 IEEE International Symposium on Computer Aided Control System Design, Kohala-Coast, Hawai'i, USA, by H. Hanselmann et al. describes a system for automatically generating production code based on a block diagram containing one or more blocks that specify the functionality of the program, such as a control program for an ECU that implements the desired control strategy.

Each signal connection between blocks in the block diagram generally results in the generation of a variable in the program code; additionally, each parameter and internal state of a block leads to the generation of a separate variable. For the generation of production quality code, a plurality of properties need to be defined for each variable. Setting properties individually for each variable is very cumbersome; defining generation settings for different classes of variables and assigning a variable class to each variable allows for reducing the effort. However, as the value ranges of the signal received by different blocks are generally different, the scaling parameters usually need to be adapted individually for each signal. A goal in preparing a block diagram for code generation is to provide enough range for accommodating all possible values of the signals while keeping sufficient sensitivity for small changes in the signal to allow for a fine-tuned control.

U.S. Pat. No. 8,495,114 B1 discloses a system and a method for determining attributes for arithmetic operations with fixed-point numbers. Different strategies for determining the scaling for a block are discussed. U.S. Pat. No. 8,805,651 B1 discloses properties, instrumentation and automatic scaling for signals in a modeling environment. For the case of different signal types, scaling properties of a second signal may depend on scaling properties of a first signal. The method comprises notifying the user when a change to a scaling property of the first signal necessitates adapting a scaling property of the second signal. Especially for more complex hierarchical blocks comprising a plurality of subordinate blocks, current methods of preparing for code generation are still of limited usefulness.

Thus, improved methods for generating source code are needed. It is particularly desirable to provide for a more comfortable mechanism for determining scaling parameters for variables corresponding to signals in hierarchical blocks.

SUMMARY OF THE INVENTION

It is therefore an object of the present invention to provide a method for preparing a block diagram for code generation and for automatically generating source code from a block diagram comprising a detailed implementation of the program.

In a first aspect of the invention, a computer-implemented method for preparing block diagrams comprising one or more blocks for code generation in a technical computing environment is provided. The technical computing environment comprises a model editor, a data definition tool and a code generator and is executed by at least one processor of a host computer. The inventive method comprises opening the block diagram in the model editor, wherein a first block is a hierarchical block comprising a plurality of subordinate blocks, at least one input port and at least one output port, wherein signals connect the at least one input port, the subordinate blocks and the at least one output port, and receiving minimum values and maximum values for the at least one input port and the at least one output port. The inventive method further comprises determining scaling parameters for the at least one input port and the at least one output port based on the received minimum and maximum values and determining scaling parameters for each subordinate block in the first block, wherein the scaling parameters of at least one subordinate block are determined based on the scaling parameters of at least one output port of the at least one output ports.

The host computer may be realized as a single standard computer comprising a processor, such as a general-purpose microprocessor, a display device and an input device. Alternatively, the host computer system may comprise one or more servers comprising a plurality of processing elements, the servers being connected to a client comprising a display device and an input device via a network. Thus, the technical computing environment may be executed partially or completely on a remote server, such as in a cloud computing setup, so that preferably only a graphical user interface of the technical computing environment is executed locally. The block diagram may comprise multiple blocks with input and/or output signals that are connected to output and/or input signals of other blocks. Any block may be an atomic functional unit or may be a hierarchical block that is composed of a plurality of subordinate blocks.

The scaling parameters may comprise a data type, a least significant bit and an offset. For cost reasons, many microcontrollers do not comprise a floating-point arithmetic unit and thus the control algorithms may need to be adapted for using fixed-point variables. The data type may need to be an integer.

Advantageously, the inventive method provides for a comfortable method to adapt the code generation settings for hierarchical blocks that are composed of a plurality of subordinate blocks. By taking into account the maximum and minimum values of the one or more output ports, the code generation settings for control algorithms comprising feedback loops are improved. These hierarchical blocks are commonly used in the development of electronic control units. In addition to a possible improvement of quality of control, improved code generation settings may reduce the number of errors or warnings received when processing the generated production code in a static analysis tool.

Scaling parameters for subordinate blocks can be determined iteratively and the order of preparing subordinate blocks is predefined for the first block. The scaling parameters of blocks receiving signals from upstream blocks depend at least indirectly on the scaling parameters of the upstream blocks; by iteratively following the signal, scaling parameters for the subsequent blocks can be determined. A predefined order for determining scaling parameters allows for reaching suitable scaling parameters for the blocks in a limited number of steps.

The first block can be a library block, and the library comprises an executable script for scaling the first block and/or a dedicated definition document. Because the structure of the library block is known when constructing the library, an optimum order can be determined once and may simply be retrieved each time the library block is used in a block diagram. The proper order may be listed in a dedicated definition document; additionally or alternatively, an executable script may be provided for determining scaling parameters of the associated block. When multiple instances of a library block are used in one block diagram, the instances may be decoupled and scaled individually based on the optimum order predefined for the library block.

Minimum and maximum values for the at least one input port and the at least one output port can be stored in the data definition tool, and scaling parameters are determined based on the stored values. This may be performed when triggered by the user or automatically each time the block diagram comprising the first block is opened in the model editor. By only storing ranges for the ports of the library block, memory may be conserved; using a script implementing the predefined order, necessary parameters for the subordinate blocks can be determined quickly and reliably.

In an embodiment, the inventive method further comprises verifying if at least one scaling condition is fulfilled for one or more of the subordinate blocks. This allows for recognizing unwanted side effects of scaling, such as a quantization in too few discrete values. By warning the user based on predefined scaling conditions, potential problems can be recognized before simulating the system.

In an embodiment, the inventive method further comprises outputting a suggestion for changing the maximum value, the minimum value or the scaling parameters of the at least one input port or of the at least one output port. Thus, the user can quickly correct settings prone to causing unwanted side effects, thereby reducing the need for time-consuming debugging.

In an embodiment, a scaling condition is not fulfilled if the range of values for an internal signal of non-Boolean type comprises less than three possible values. While the scaling may formally be correct in case of severe quantization, the quality of the regulation would suffer due to the inability to closely monitor changes in the input signals.

In an embodiment, the scaling parameters for each subordinate block are determined based on the scaling parameters of adjacent blocks or the input ports or the output ports upstream of the subordinate block. Considering output ports allows for an improved scaling for hierarchical blocks with feedback.

In an embodiment, the scaling parameters for atomic blocks are stored in and retrieved from the data definition tool. Thus, all parameters related to code generation can be kept in one place; the data definition tool may comprise additional tools for more comfortable managing these data.

In a second aspect of the invention, a method for generating source code based on a block diagram comprising one or more blocks is provided. The method comprises preparing the block diagram with the inventive method discussed above, retrieving additional code generation settings from the data definition tool, and generating production code based on the prepared block diagram and the additional code generation settings. In an embodiment, the method further comprises compiling the production code with a compiler adapted to a target processor and transferring the resulting binary to an embedded system comprising a target processor.

An aspect of the invention also concerns a non-transitory computer-readable medium, which contains instructions that, when executed by a microprocessor of a computer system, cause the computer system to carry out the inventive method as described above or in the appended claims.

In a further aspect of the invention, a computer system is provided which comprises a host computer that comprises a processor, a random-access memory, a graphics controller connected to a display, a serial interface connected to at least one human input device, and a nonvolatile memory, such as a hard disk or a solid-state disk. The nonvolatile memory comprises instructions that, when executed by the processor, cause the computer system to carry out the inventive method. In an embodiment, the computer system further comprises an embedded system connected to the host computer, the embedded system comprising a target processor.

The processor may be a general-purpose microprocessor that is customary used as the central processing unit of a personal computer or it may comprise one or a plurality of processing elements adapted for carrying out specific calculations, such as a graphics-processing unit. In alternative embodiments of the invention, the processor may be replaced or complemented by a programmable logic device, such as a field-programmable gate array, which is configured to provide a defined set of operations and/or may comprise an IP core microprocessor.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
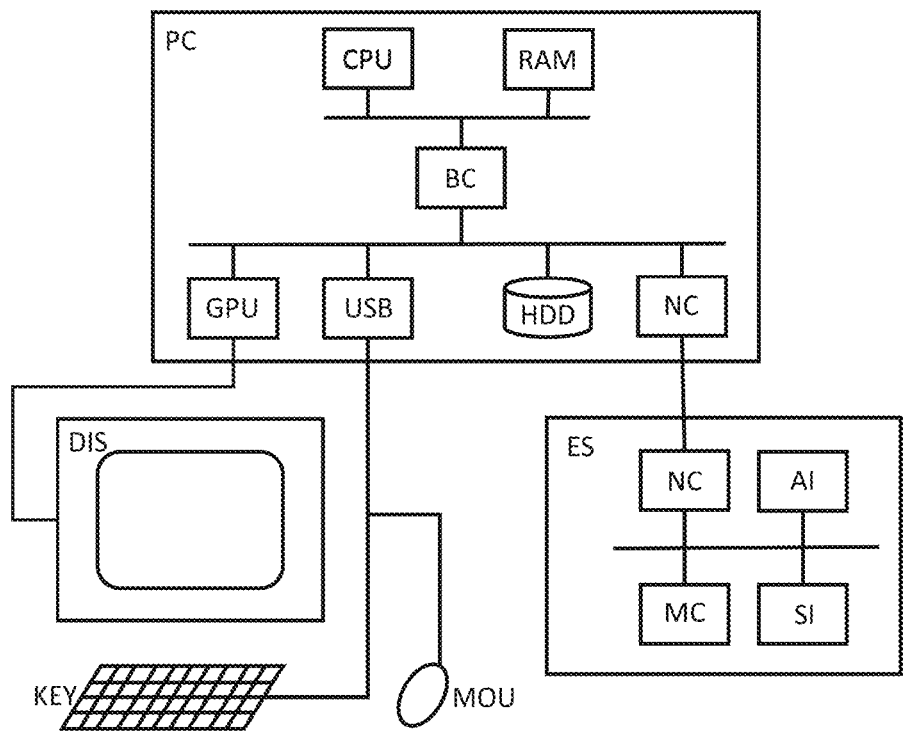
FIG. 1 is an exemplary diagram of a computer system.

FIG. 1 illustrates an exemplary embodiment of a computer system.

The shown embodiment comprises a host computer PC with a display DIS and human interface devices such as a keyboard KEY and a mouse MOU; further, an embedded system ES is depicted, which may e.g. be used for a processor-in-the-loop simulation.

The host computer PC comprises at least one processor CPU with one or multiple cores, a random-access memory RAM and a number of devices connected to a local bus (such as PCI Express), which exchanges data with the CPU via a bus controller BC. The devices comprise e.g. a graphics-processing unit GPU for driving the display, a controller USB for attaching peripherals, a non-volatile memory HDD such as a hard disk or a solid-state disk, and a network interface NC. Preferably, the non-volatile memory comprises instructions that, when executed by one or more cores of the processor CPU, cause the computer system to carry out a method according to one of the claims.

The embedded system ES comprises a network interface NC, an actuator interface AI and a sensor interface SI as well as a microcontroller MC. As an alternative or addition to the microcontroller MC, the embedded system ES may comprise a programmable logic device such as a field-programmable gate array. The programmable logic device may contain a hardwired digital signal processor and it may be configured to comprise an IP core microprocessor. Preferably, the embedded system ES is connected to the personal computer PC via the network interface NC, which may e.g. be of USB, RS-232 or Ethernet type. The embedded system may comprise a non-volatile memory that comprises instructions to be carried out by the microcontroller or a configuration to be loaded on the programmable logic device.

The host computer may also comprise one or more servers comprising one or more processing elements, the servers being connected to a client comprising a display device and an input device via a network. Thus, the technical computing environment may be executed partially or completely on a remote server, such as in a cloud computing setup. A personal computer may be used as a client comprising a display device and an input device via a network. Alternatively, a graphical user interface of the technical computing environment may be displayed on a portable computing device, in particular a portable computing device with a touch screen interface.

The computer system may not comprise an embedded system ES. While the embedded system ES is useful for carrying out a processor-in-the-loop simulation of a control program, the presence of an embedded system may not be necessary for carrying out at least some aspects of the present invention.

Figure 2:
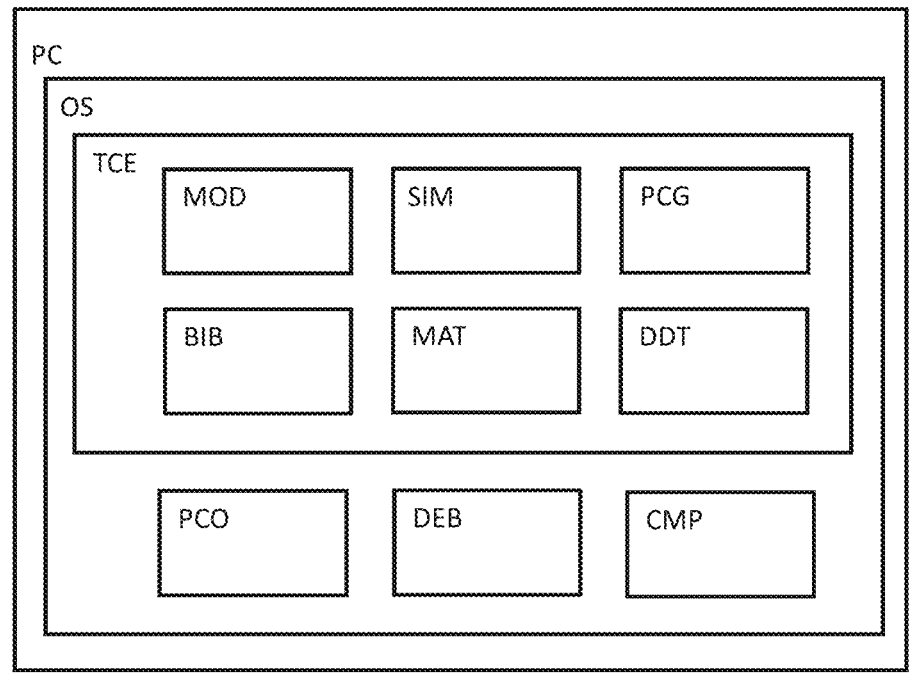
FIG. 2 is an exemplary diagram of software components in a computer system.

FIG. 2 displays an exemplary embodiment of the software components being executed on a computer system, which may be realized as a host computer PC with a standard microprocessor that runs a standard operating system OS such as Microsoft Windows or a Linux distribution.

On the host computer PC, a technical computing environment TCE such as MATLAB/Simulink of The MathWorks may be installed. Other examples of technical computing environments comprise LabVIEW of National Instruments or ASCET of ETAS. The technical computing environment TCE comprises a plurality of software components such as a model editor MOD and a simulation engine SIM. Additionally, the TCE may comprise a mathematical and/or script interpreter MAT that is adapted for carrying out calculations or modifying data. The TCE comprises a production code generator PCG that is adapted to produce production code from a model; further, it comprises a data definition tool DDT and it may comprise a documentation generator. The expression that a software component is comprised in the TCE is intended to encompass the case that the software component uses a specific mechanism of the TCE such as an application-programming interface of the TCE for exchanging data and/or instructions with other software components in the TCE. For example, a software component may be realized as or comprise an add-on such as a toolbox for the model editor.

The model editor MOD may provide a graphical user interface for creating and modifying block diagrams that preferably describe the temporal behavior of a dynamic system. Additionally, blocks adapted for describing finite states and conditions for transitions between states may be used to model the dynamic system. A block may describe an atomic operation, such as an arithmetic calculation or a logic expression, or it may represent a subsystem that is described in more detail by an additional or partial block diagram in a subordinate hierarchical level. This need not imply that the partial block diagram is stored in a separate file, but rather that the functionality of a hierarchical block is defined by a plurality of blocks in a subordinate level. Alternatively, it may contain code in a higher-level programming language, in particular a dynamic language intended for mathematical programming, that realizes the block's functionality. Multiple blocks may be connected by signals for the exchange of data. For example, an initial block may receive a signal of type single as input signal, may modify the signal e.g. by adding a constant and may send an output signal of type double to a further block. It may be said that the further block is downstream of the initial block because they are connected by a signal path so that data flows from the initial block to the further block.

The technical computing environment may comprise one or more block libraries BIB comprising blocks to be used in the construction of more complex block diagrams. The library blocks may be hierarchical blocks, i.e. they may be implemented by a plurality of subordinate blocks. The block library BIB may comprise scripts for scaling the library blocks and a rule list or rule script. A rule may comprise a filter that matches once a predetermined condition is fulfilled and an action to be performed in case of a match. The action may comprise outputting a warning and/or adjusting one or more code generation parameters, in particular scaling parameters.

The simulation engine SIM may be adapted to execute a block diagram created in the model editor MOD for observing the temporal behavior of the dynamic system described by the block diagram. The execution of a block diagram may also be called a model-in-the-loop simulation of the dynamic system and is preferably carried out using high-precision operations in order to observe the behavior more closely and to create reference data.

The production code generator PCG allows for creating production code from one or more blocks in a block diagram. Production code may be optimized for readability, traceability, safety, low-energy consumption, execution speed and/or memory requirements. Preferably, the code generator provides a user interface for setting a plurality of options for adapting the customization of the generated code. Customization options may include target-specific optimizations for the microcontroller of the embedded system and enforcing compliance of the generated code to a specific standard, such as the MISRA C guidelines. A particularly preferred production code generator PCG is TargetLink of dSPACE.

The data definition tool DDT provides a local or remote database for storing definitions and parameters as well as an application-programming interface for automatic exchange of the data between different software components. The term "database" is to be understood in a broad sense, so that a file with a tree structure may be considered a database. A data definition tool allows for a clean separation of the model of the dynamic system given in the block diagram from implementation-specific details stored in the database. When a complex model is structured in different sub-models, data in different sub-models may be linked. By storing corresponding information in the data definition tool, these dependencies may be automatically resolved. Additionally, by exchanging data with a software architecture tool, the data definition tool DDT can be used as part of a higher-level tool chain, so as to generate product code compliant to the AUTOSAR standard. A preferred data definition tool is TargetLink Data Dictionary of dSPACE.

Other software components such as a production code compiler PCO, a debugger DEB or a comparison tool CMP may also be installed on the computer. These software components may be interfaced to each other and/or the technical computing environment using standard mechanisms of the underlying operating system OS. The compiler PCO may generate an executable for the microprocessor of the PC or it may generate an object code for the microcontroller of the embedded system. Additionally, it may be configured to generate additional debugging information and to include it in the executable. In this way, the debugger DEB can e.g. be used for observing the value of a signal during a software-in-the-loop simulation of the generated production code. Depending on the intended use, the observed values may be directly displayed to the user and/or they may be logged in a memory, e.g. in RAM, in a file or a database.

Figure 3:
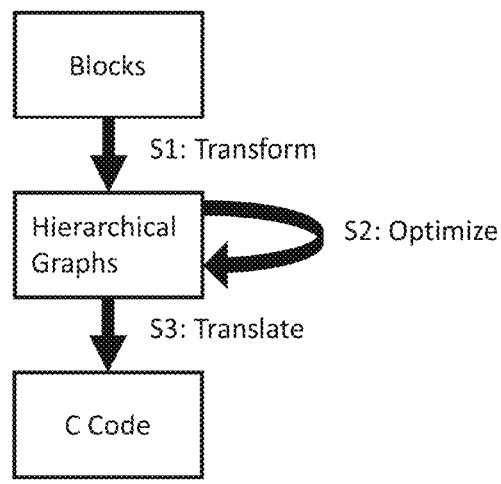
FIG. 3 is an exemplary diagram of a method for generating production code from a block diagram.

FIG. 3 illustrates an exemplary embodiment of the generation of production code from one or more blocks in a block diagram. The following steps are preferably carried out by a microprocessor on the host computer; alternatively, a client server setup may be used so that computationally expensive steps are carried on a remote server containing a plurality of microprocessors.

In a first step S1, the selected one or more blocks (or, if selected, the entire block diagram) and related input data are transformed to an intermediate representation such as one or more hierarchical graphs. These hierarchical graphs may in particular comprise a data flow graph, a control flow graph and/or a tree structure. Related input data may e.g. be extracted from a database associated with the block diagram. This may encompass situations where elements of the block diagram are created based on information from a data definition tool, or where settings relevant for the production code generation are retrieved from the data definition tool.

In a second step S2, the hierarchical graphs are optimized in order to reduce the number of variables required and/or the number of operations or instructions to be carried out. This optimization may comprise a plurality of intermediate steps on further intermediate representations between block level and production code level. In each step, an initial set of hierarchical graphs or an intermediate language is converted to a modified set of hierarchical graphs or an intermediate language while applying one or more optimization rules. A number of strategies such as constant folding or elimination of dead code may be applied during optimization.

In a third step S3, the optimized intermediate representations such as optimized hierarchical graphs are translated to code in a high-level or low-level programming language, preferably C code. The code may be further optimized in this step and restricted to a subset of the linear or parallel programming language, the control and dataflow structures may be restricted to precisely specified variants, the scope of functions and data may be restricted according to accurately specified rules. Alternatively or in addition, additional information may be added to the code, e.g. in the form of comments, to enhance readability or help in debugging the code.

During or after the code generation, information on the current block diagram or the code generation, especially results of the code generation, may again be stored in a database such as the data definition tool. This information may e.g. be used to initialize the simulation engine, to influence a compilation process with a production code compiler, or to export production code information for use in other tools/process, like e.g. calibration and measurement information in ASAP2 format (in particular a variable description file) or AUTOSAR XML information. Preferably, a documentation is generated automatically after production code generation has been finished. In alternative embodiments, hardware-level code or a configuration for a programmable hardware device may be created from the blocks describing the control program.

Figure 4:
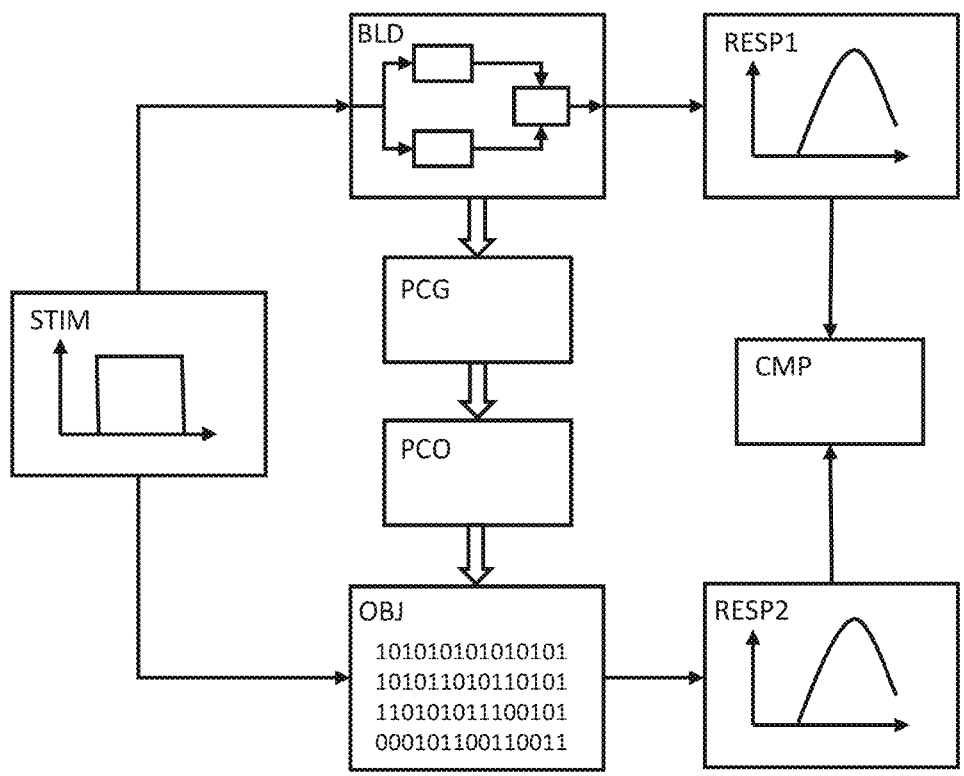
FIG. 4 is an exemplary diagram of a method for testing the compliance of the executable with a model specifying the desired behavior.

FIG. 4 displays an exemplary embodiment of a method for compiling and testing a control program.

The model editor MOD of the TCE preferably comprises a graphical user interface for modifying a block diagram BLD, which may comprise a plurality of blocks interconnected by signal paths. Each block may be an atomic block providing a specific functionality or it may represent a hierarchical block such as a subsystem, which comprise a plurality of subordinate blocks that are shown in a lower hierarchical level. Blocks may be connected by signals which may be of scalar or composite type and which can be represented by arrows indication the direction of the data flow. In the shown example, the block diagram comprises three blocks, an input port for receiving an input signal and an output port for sending an output signal. Preferably, the block diagram describes the predetermined or intended behavior of a control program. Upon activation of the simulation engine in the technical computing environment, the block diagram BLD is executed and results are calculated for each time step. The block diagram may be interpreted directly or it may be converted to an intermediate form that allows for a faster execution in the simulation engine.

Preferably, a number of test cases for the control program have been deduced from the specification and intended application of the control program. Advantageously, a test case comprises a stimulus STIM sent as an input signal to the control program and a corresponding response RESP received as an output signal from the control program. In the shown example, the stimulus STIM is represented by a diagram depicted a particular temporal behavior of the input signal. When the control program is executed in the simulation engine on the host computer, operations corresponding to the block diagram BLD are carried out for a plurality of time steps. During each time step, the current value of the stimulus STIM is fed to the appropriate input ports of the block diagram, the block diagram BLD is being executed in the simulation engine, so that signals are being manipulated and a new internal state of the model may be reached. By simulating the model given in the block diagram for a predetermined duration and by recording the output signal, a response RESP1 can be determined in a model-in-the-loop simulation. A model-in-the-loop simulation mode may be used for verifying that the block diagram executed in the simulation engine accurately describes the intended behavior of the control program. All arithmetic calculations can be carried out with high-precision operations, e.g. using the floating-point data type double for the variables. As a result, the simulation is sufficiently accurate to use the recorded output signals as reference data.

Once correctness of the model has been established and reference data has been stored, the blocks corresponding to the control program are converted to program code via the production code generator PCG. The generated production code is then compiled to object code or an executable using the production code compiler PCO; an object code is binary data that contains instructions for a target processor. When the object code is combined with additional information for the operating system of the host computer, an executable for the host computer is formed. Settings applied during the code generation may comprise a conversion to lower-precision operations that are computationally more efficient, e.g. integer instructions for fixed-point calculations, so that the control program later can be executed in real-time on the microcontroller of an embedded system.

In order to verify that the calculations of the generated code are sufficiently accurate and match the behavior of the blocks in the graphical model, a software-in-the-loop simulation or a processor-in-the-loop simulation may be carried out. The object code or the executable OBJ, which may be in the form of a DLL, contains calculations corresponding to the block diagram. During a predetermined duration, a stimulus STIM is fed to the object code or executable OBJ, and the output signals are recorded to obtain a response RESP2. Generally, multiple variables may be logged while running the simulation; this may comprise adding log macros to the program code prior to the simulation and determine a basic data type of an enumeration signal when initializing the simulation.

The response RESP1 of the model-in-the-loop simulation may be displayed on the host computer simultaneously with the response RESP2 of the generated code, so that a visual comparison may be performed by the user. Additionally or alternatively, the response RESP1 and RESP2 may be compared in a comparison tool CMP, so that a number of checks for compliance to predetermined conditions may be carried out. Preferably, the output signals are compared point by point; in particular, the absolute difference between a data point in RESP1 and the corresponding data point in RESP2 may be calculated. By comparing the differences to a threshold indicating a maximum permissible difference, the correctness of the optimizations applied when generating and compiling the code can be verified.

Figure 5:
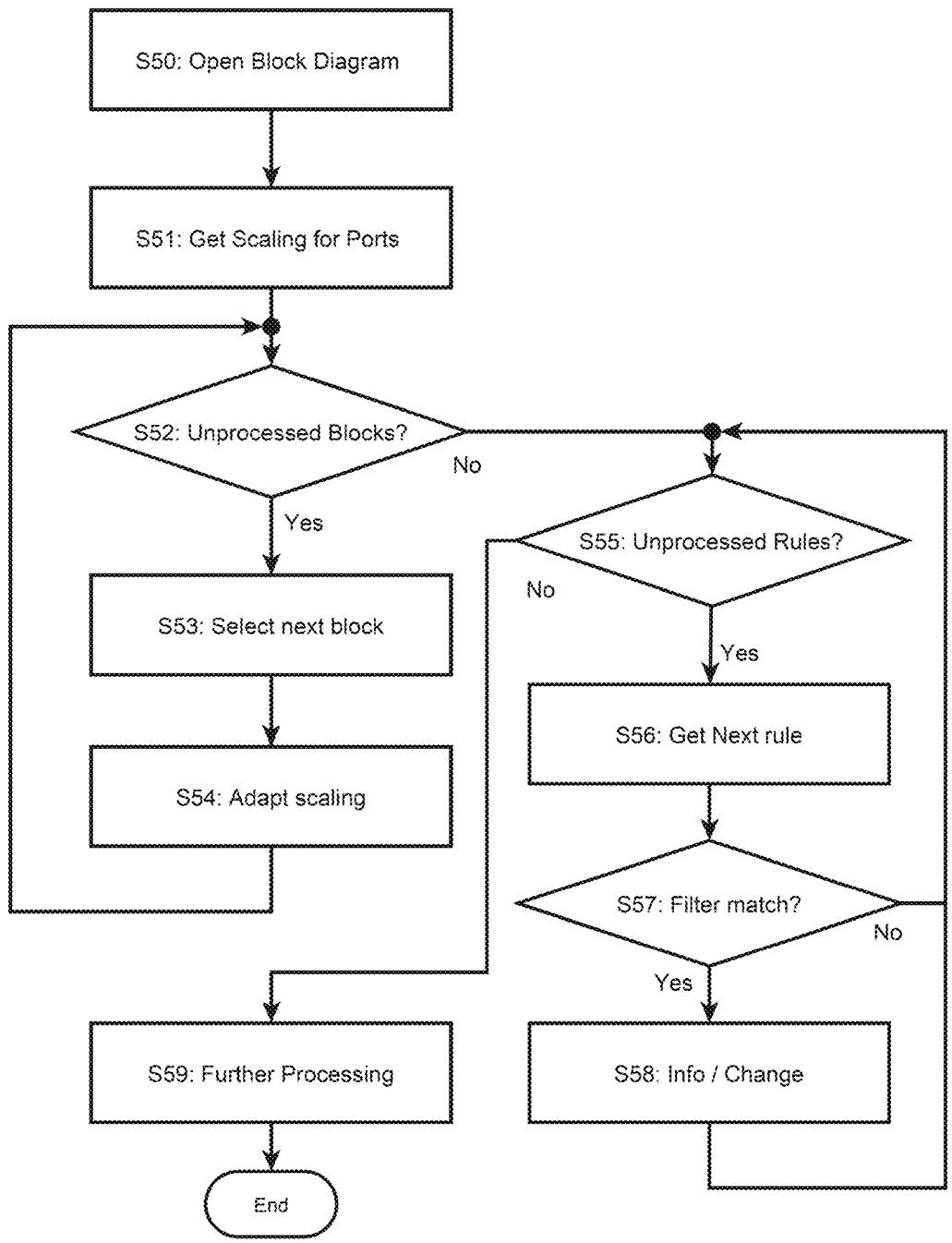
FIG. 5 is a schematic diagram of a method for preparing a block diagram for code generation according to the invention.

FIG. 5 illustrates a method for preparing a block diagram for code generation according to the invention.

The method starts by opening the block diagram in step S50 (Open Block Diagram). This may encompass retrieving parameters for code generation from the data definition tool DDT and/or calculating parameter values in the mathematical interpreter MAT.

In step S51 (Get Scaling for Ports), the processor of the host computer receives scaling parameters for the input/output ports of a hierarchical block/subsystem. These scaling parameters could preferably be given as the maximum and the minimum value that the signal received at/emitted by the input/output port.

In step S52 (Unprocessed Blocks?) the processor verifies if any block still lacks the scaling parameters necessary for fixed point code generation. When this is the case, the processor selects the next block to process in step S53 (Select next block). The next block may be selected via predefined conditions (e.g. all blocks directly upstream of the selected have been assigned a complete set of code generation parameters), or (especially in the case of library blocks) the subordinate blocks for a given hierarchical block are processed in a predefined order.

In step S54 (Adapt Scaling), the scaling parameters for the selected block are determined based on the blocks directly connected by signal. The minimum and maximum values of an input port can be determined based on the minimum and maximum values of the received signal/the output port emitting the signal. Based on the range, i.e. the minimum and maximum values, suitable values for one or more scaling parameters can be chosen. The scaling parameters comprise a data type, a least significant bit and an offset. The data type may be a signed or unsigned integer, for instance with a word length or width n=8, 16 or 32. A measured value x may be represented in the form $x=s\cdot\tilde{x}+o$ where s denotes the value of the least significant bit, $\tilde{x}$ is the integer representation of x and o denotes an offset by which the integer number range is shifted. For a signed integer with a word length of n, the covered range is $-2^{n-1}\cdot s+o \leq x \leq (2^{n-1}-1)\cdot s+o$. For an unsigned integer with a word length of n, the covered range is $o \leq x \leq (2^n-1)\cdot s+o$. The word length may be fixed based on the data types supported by the microcontroller used in the target system. Based on the desired range, the other values can then be calculated. For a suitable representation of floating point values, the least significant bit should be as small as possible (given the word length and the value range to be covered). Execution continues at step S52 in order to check if any unprocessed block remains.

Once no unprocessed block remains, different rules for finding possible scaling problems and/or suggestions for improving the scaling are processed. In step S55 (Unprocessed Rules?), the processor determines if any rule remains to be applied to the block diagram. When this is the case, the next rule to be processed is retrieved in step S56 (Get Next Rule). The embodiment discussed here assumes that rules are given as a list assigned to the current hierarchical. Alternatively, a fixed script for applying all relevant rules one by one could be used.

In step S57 (Filter match?), the processor verifies if the filter condition associated with the current rule is fulfilled, i.e. if the filter of the rule matches. When this is the case, in step S58 (Info/Change) a message is output to the user; alternatively or additionally, a graphical user interface for changing a scaling parameter or confirming a proposed change of the scaling parameter may be shown to the user. When the information or change has been performed or the filter of the rule did not match, execution continues in step S55 by checking if any rule remains to be applied.

Once all rules have been applied, comprising interactive review of the messages and/or performing changes to relevant parameters, the block diagram is processed further in step S59 (Further Processing). This may comprise adapting other parts of the model/block diagram; when the whole model is adapted, production code may be generated for the block diagram.

Figure 6:
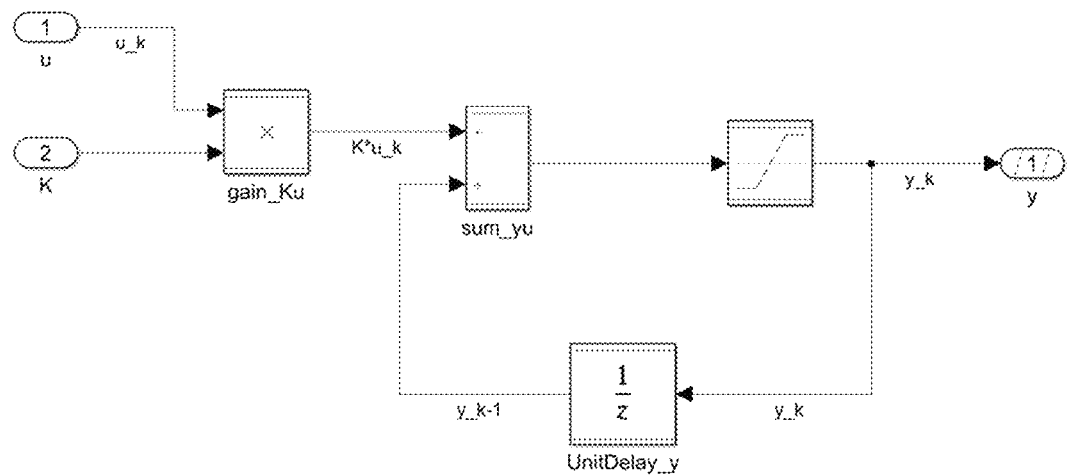
FIG. 6 is an exemplary block diagram of a control program.

FIG. 6 displays an exemplary block diagram of a control program. The shown blocks may be subordinate blocks to a hierarchical block that is provided as a library block for use in more complex control programs.

The block diagram comprises a first input port u, a second input port K and a single output port y. The first input port u emits a signal u_k that is received by multiplication block gain_Ku. The second input port is also connected to the multiplication block gain_Ku. The resulting signal K*u_k is sent to a sum block sum_yu. The sum block sum_yu is connected to a saturation block that limits the signal values to a predetermined range. The resulting signal y_k is the sent to the output port y. Via a delay block UnitDelay_y, the signal y_k is also received by sum block sum_yu, thus producing a feedback.

Scaling parameters for the exemplary block diagram can be calculated based on the following strategy:

For each block, the least significant bit s should be selected as small as possible (cf. step S54 above); based on the given data type, the smallest s for which the desired range is still covered should be chosen.

Data type and least significant bits for the input and output ports, i.e. the blocks u, K and y are chosen by the user. Additionally, the user can specify a range for each of the signals, otherwise the maximal possible range of the selected least significant bit and data type will be taken into consideration.

The user may select a data type such as 16 bit or 32 bit signed or unsigned integer to be used for the scaling. The other scaling parameters, least significant bit and offset, will subsequently be calculated for the different blocks.

For the block gain_Ku, the signal range is calculated from the signal ranges of u and K multiplied together.

Since block sum_yu receives signal y_k, scaling for that signal path is calculated next. Scaling parameters for the block UnitDelay_y are chosen so that it covers the same ranges as the output port y.

Then scaling parameters for block sum_yu can be determined. The desired range is calculated by adding the ranges of block gain_Ku and UnitDelay_y. The least significant bit for sum_yu is chosen so as to cover the desired range given the selected data type.

For block sum_yu, a rule may be processed: If the least significant bit of block sum_yu is less than the least significant bit of output port y, the processor outputs a warning message to the user. Matching of this filter indicates that the signal emitted from the block loses accuracy by going from a smaller (more accurate) least significant bit to a bigger one. Preferably, an exemplary adjustment for improving the accuracy is shown to the user.

Scaling parameters for the saturation block may be chosen based on the adjacent delay block UnitDelay_y or based on the specified from output port y (if saturation is activated/selected).

For example, the following entries may have been made by the user:
Block y; Type: Int16, LSB: $2^{-3}$, Range [−10 10]
Input u; Type: Int16, LSB: $2^{-6}$, Range [−10 10]
Input K; Type: Int16, LSB: $2^{-6}$, Range [0 1]
Internal base-type for scaling: 16 bit
Saturate output: Active Executing the inventive method then results in the following ranges/scaling parameter:
Block gain_Ku; Type: Int16, LSB: $2^{-11}$, Range [−10 10]
UnitDelay_y; Type: Int16, LSB: $2^{-3}$, Range [−10 10]
sum_yu; Type: Int16, LSB: $2^{-10}$, Range [−20 20]
Saturation block; 16 bit, LSB: $2^{-3}$, Range [−10 10] (with active limits)

In the given example, the user has chosen ranges that do not entirely fit the data type and least significant bit for inputs signal. Therefore, the determined scaling will have a much smaller least significant bit in comparison to the input signals, thus allowing for high accuracy calculations.

Additionally, the user will receive a warning for the block sum_yu in this example. The least significant bit for the block sum_yu is smaller than that for the output port, resulting in a loss of accuracy. Advantageously, a suggestion is output to the user, proposing to select a scaling smaller or equal to $2^{-11}$ for the output signal or to reconsider the ranges of the block.

Those skilled in the art will appreciate that the order of at least some of the steps of the inventive method may be changed without departing from the scope of the claimed invention. While the present invention has been described with respect to a limited number of embodiments, those skilled in the art will appreciate numerous modifications and variations therefrom. It is intended that the appended claims cover all such modifications and variations as fall within the true spirit and scope of the present invention.

What is claimed is:

1. A method for preparing a block diagram comprising one or more blocks for code generation in a technical computing environment, the technical computing environment comprising a model editor, a data definition tool, and a code generator, the technical computing environment being executed by at least one processor of a host computer, the method comprising:
   opening the block diagram in the model editor, wherein a first block is a hierarchical block comprising a plurality of subordinate blocks, at least one input port and at least one output port, wherein signals connect the at least one input port, the subordinate blocks and the at least one output port;
   receiving minimum values and maximum values for the at least one input port and the at least one output port;
   determining scaling parameters for the at least one input port and the at least one output port based on the received minimum and maximum values;
   determining scaling parameters for at least one subordinate block in the first block, wherein the scaling parameters of the at least one subordinate block are determined based on the scaling parameters of at least one output port of the at least one output ports;
   verifying if at least one scaling condition is fulfilled for the at least one subordinate block;
   generating a warning to a user based on predefined scaling conditions; and
   generating production code based on the block diagram and the scaling parameters,
   wherein the at least one scaling condition is not fulfilled if a range of values for an internal signal of non-Boolean type comprises less than three possible values.

2. The method of claim 1, wherein the scaling parameters for subordinate blocks are determined iteratively, and wherein an order of preparing subordinate blocks is predefined for the first block.

3. The method of claim 2, wherein the first block is a library block and wherein the library block comprises an executable script for scaling the first block and/or a dedicated definition document.

4. The method of claim 2, wherein the minimum and the maximum values for the at least one input port and the at least one output port are stored in the data definition tool, and wherein the scaling parameters are determined based on the stored values.

5. The method of claim 1, further comprising outputting a suggestion for changing the maximum value, the minimum value or the scaling parameters of the at least one input port or of the at least one output port.

6. The method of claim 1, wherein the scaling parameters for each subordinate block are determined based on the scaling parameters of adjacent blocks or the input ports or the output ports upstream of the subordinate block.

7. The method of claim 1, wherein the scaling parameters comprise a data type, a least significant bit and an offset.

8. The method of claim 1, wherein the scaling parameters for atomic blocks are stored in and retrieved from the data definition tool.

9. The method of claim 1, further comprising: executing the block diagram including the first block, the at least one subordinate block, and signal paths in a simulation engine of the technical computing environment of the host computer.

10. A method for generating source code based on a block diagram, comprising one or more blocks, in a technical computing environment, the technical computing environment comprising a model editor, a data definition tool, a simulation engine, and a code generator, the technical computing environment being executed by at least one processor of a host computer, the method comprising:

opening the block diagram in a model editor, wherein a first block is a hierarchical block comprising a plurality of subordinate blocks, at least one input port and at least one output port, wherein signals connect the at least one input port, the subordinate blocks and the at least one output port;

receiving minimum values and maximum values for the at least one input port and the at least one output port;

determining scaling parameters for the at least one input port and the at least one output port based on the received minimum and maximum values;

determining scaling parameters for at least one subordinate block in the first block, wherein the scaling parameters of the at least one subordinate block are determined based on the scaling parameters of at least one output port of the at least one output ports;

verifying if at least one scaling condition is fulfilled for the at least one subordinate block;

generating a warning to a user based on predefined scaling conditions; retrieving additional code generation settings from a data definition tool; and generating production code based on a scaled block diagram and the additional code generation settings, wherein the at least one scaling condition is not fulfilled if a range of values for an internal signal of non-Boolean type comprises less than three possible values.

11. A non-transitory computer-readable medium containing instructions that, when executed by a microprocessor of a computer system, cause the computer system to carry out a method according to claim 10.

12. A computer system comprising a host computer comprising:
 a microprocessor;
 a random access memory;
 a graphics controller connected to a display;
 a serial interface connected to at least one human input device; and
 a nonvolatile memory, a hard disk and/or a solid state disk, the nonvolatile memory comprising instructions that, when executed by the microprocessor, cause the computer system to carry out the method according to claim 1.

* * * * *